United States Patent
Gettmey

(10) Patent No.: US 7,852,430 B1
(45) Date of Patent: Dec. 14, 2010

(54) LIGHT GUIDE SPACERS FOR BACKLIGHTING A REFLECTIVE DISPLAY

(75) Inventor: Shawn R. Gettmey, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 09/997,532

(22) Filed: Nov. 29, 2001

(51) Int. Cl.
    G02F 1/1335   (2006.01)
    G02F 1/1333   (2006.01)
(52) U.S. Cl. .............. 349/61; 349/62; 349/98; 349/111
(58) Field of Classification Search ............. 349/61–65, 349/98, 113, 117
    See application file for complete search history.

(56) References Cited

U.S. PATENT DOCUMENTS

| | | |
|---|---|---|
| 4,429,478 A | 2/1984 | Bruce-Sanders |
| 5,130,500 A | 7/1992 | Murakami et al. |
| 5,233,502 A | 8/1993 | Beatty et al. |
| 5,357,061 A | 10/1994 | Crutchfield |
| 5,510,813 A | 4/1996 | Makinwa et al. |
| 5,534,888 A | 7/1996 | Lebby et al. |
| 5,554,828 A | 9/1996 | Primm |
| 5,579,036 A | 11/1996 | Yates, IV |
| 5,634,080 A | 5/1997 | Kikinis et al. |
| 5,641,219 A | 6/1997 | Mizobe |
| 5,696,982 A | 12/1997 | Tanigawa et al. |
| 5,764,322 A * | 6/1998 | Mamiya et al. ............... 349/65 |
| 5,785,439 A | 7/1998 | Bowen |
| 5,786,665 A | 7/1998 | Ohtsuki et al. |
| 5,838,309 A | 11/1998 | Robsky et al. |
| 5,854,625 A | 12/1998 | Frisch et al. |
| 5,907,375 A | 5/1999 | Nishikawa et al. |
| 5,949,643 A | 9/1999 | Batio |
| 5,995,084 A | 11/1999 | Chan et al. |
| 6,017,584 A | 1/2000 | Albert et al. |
| D425,036 S | 5/2000 | Copus et al. |
| 6,057,814 A | 5/2000 | Kalt |
| 6,067,074 A | 5/2000 | Lueders |
| 6,068,381 A | 5/2000 | Ayres |
| 6,069,593 A | 5/2000 | Lebby et al. |
| 6,108,195 A | 8/2000 | Behl et al. |
| 6,118,426 A | 9/2000 | Albert et al. |
| 6,144,358 A | 11/2000 | Narayanaswamy et al. |
| 6,163,313 A | 12/2000 | Aroyan et al. |
| 6,181,842 B1 | 1/2001 | Francis et al. |
| 6,191,833 B1 * | 2/2001 | Hirakata ...................... 349/61 |
| 6,210,771 B1 | 4/2001 | Post et al. |
| 6,215,476 B1 | 4/2001 | Depew et al. |
| 6,229,502 B1 | 5/2001 | Schwab |
| 6,252,564 B1 | 6/2001 | Albert et al. |
| 6,256,009 B1 | 7/2001 | Lui et al. |

(Continued)

FOREIGN PATENT DOCUMENTS

EP    0668569 A2    8/1995

(Continued)

*Primary Examiner*—Howard Weiss
*Assistant Examiner*—Steven H Rao

(57) ABSTRACT

Light guide spacers for backlighting a reflective display. Embodiments of the present invention are directed to a reflective display assembly for an electronic device which is disposed above a backlight device. A light guide extends through the reflective display to conduct light from the backlight device, through the reflective display, and to a top surface of the reflective display. The display assembly may be used with a handheld computer system.

23 Claims, 8 Drawing Sheets

U.S. PATENT DOCUMENTS

| | | | |
|---|---|---|---|
| 6,262,717 B1 | 7/2001 | Donohue et al. | |
| 6,266,473 B1 * | 7/2001 | Saccomanno et al. | 385/140 |
| 6,295,403 B1 * | 9/2001 | Takeuchi et al. | 385/129 |
| 6,297,945 B1 | 10/2001 | Yamamoto | |
| 6,304,763 B1 | 10/2001 | Jahagirdar et al. | |
| 6,309,081 B1 | 10/2001 | Furihata | |
| 6,311,076 B1 | 10/2001 | Peuhu et al. | |
| 6,326,613 B1 | 12/2001 | Heslin et al. | |
| 6,327,482 B1 | 12/2001 | Miyashita | |
| 6,330,386 B1 | 12/2001 | Wagner et al. | |
| 6,333,736 B1 | 12/2001 | Sandbach | |
| 6,340,957 B1 | 1/2002 | Adler et al. | |
| 6,341,872 B1 * | 1/2002 | Goto | 362/31 |
| 6,343,006 B1 | 1/2002 | Moscovitch et al. | |
| 6,343,519 B1 | 2/2002 | Callicott et al. | |
| 6,347,873 B1 | 2/2002 | Hosseini et al. | |
| 6,352,350 B1 | 3/2002 | Ma | |
| 6,367,934 B1 | 4/2002 | Salesky et al. | |
| 6,377,228 B1 | 4/2002 | Jenkin et al. | |
| 6,377,324 B1 | 4/2002 | Katsura | |
| 6,392,786 B1 | 5/2002 | Albert | |
| 6,400,376 B1 | 6/2002 | Singh et al. | |
| 6,415,138 B2 | 7/2002 | Sirola et al. | |
| 6,424,403 B1 | 7/2002 | Leenhouts et al. | |
| 6,456,279 B1 * | 9/2002 | Kubo et al. | 345/173 |
| 6,466,202 B1 | 10/2002 | Suso et al. | |
| 6,466,292 B1 | 10/2002 | Kim | |
| 6,483,498 B1 | 11/2002 | Colgan et al. | |
| 6,485,157 B2 * | 11/2002 | Ohkawa | 362/31 |
| 6,492,979 B1 | 12/2002 | Kent et al. | |
| 6,536,909 B1 * | 3/2003 | Azorin | 362/31 |
| 6,556,189 B1 | 4/2003 | Takahata et al. | |
| 6,565,189 B2 | 5/2003 | Yamada et al. | |
| 6,576,887 B2 * | 6/2003 | Whitney et al. | 250/227.11 |
| 6,577,496 B1 | 6/2003 | Gioscia et al. | |
| 6,601,961 B1 * | 8/2003 | Masaki | 362/26 |
| 6,607,297 B2 * | 8/2003 | Egawa | 362/551 |
| 6,630,928 B1 | 10/2003 | McIntyre et al. | |
| 6,662,244 B1 | 12/2003 | Takahashi | |
| 6,865,076 B2 | 3/2005 | Lunsford | |
| 6,950,087 B2 | 9/2005 | Knox et al. | |
| 6,955,198 B2 | 10/2005 | Wodjenski | |
| 6,965,375 B1 | 11/2005 | Gettemy et al. | |
| 6,992,659 B2 | 1/2006 | Gettemy | |
| 7,046,282 B2 | 5/2006 | Zhang et al. | |
| 2002/0021258 A1 | 2/2002 | Koenig | |
| 2002/0021622 A1 | 2/2002 | Baroche | |
| 2002/0149571 A1 | 10/2002 | Roberts | |
| 2003/0114200 A1 | 6/2003 | Lee | |
| 2004/0165060 A1 | 8/2004 | McNelley et al. | |

FOREIGN PATENT DOCUMENTS

| | | |
|---|---|---|
| EP | 0898223 | 2/1999 |
| JP | 2003-84142 A * | 9/2001 |
| WO | 0059179 | 10/2000 |
| WO | 0079372 | 12/2000 |
| WO | 0153919 | 7/2001 |

* cited by examiner

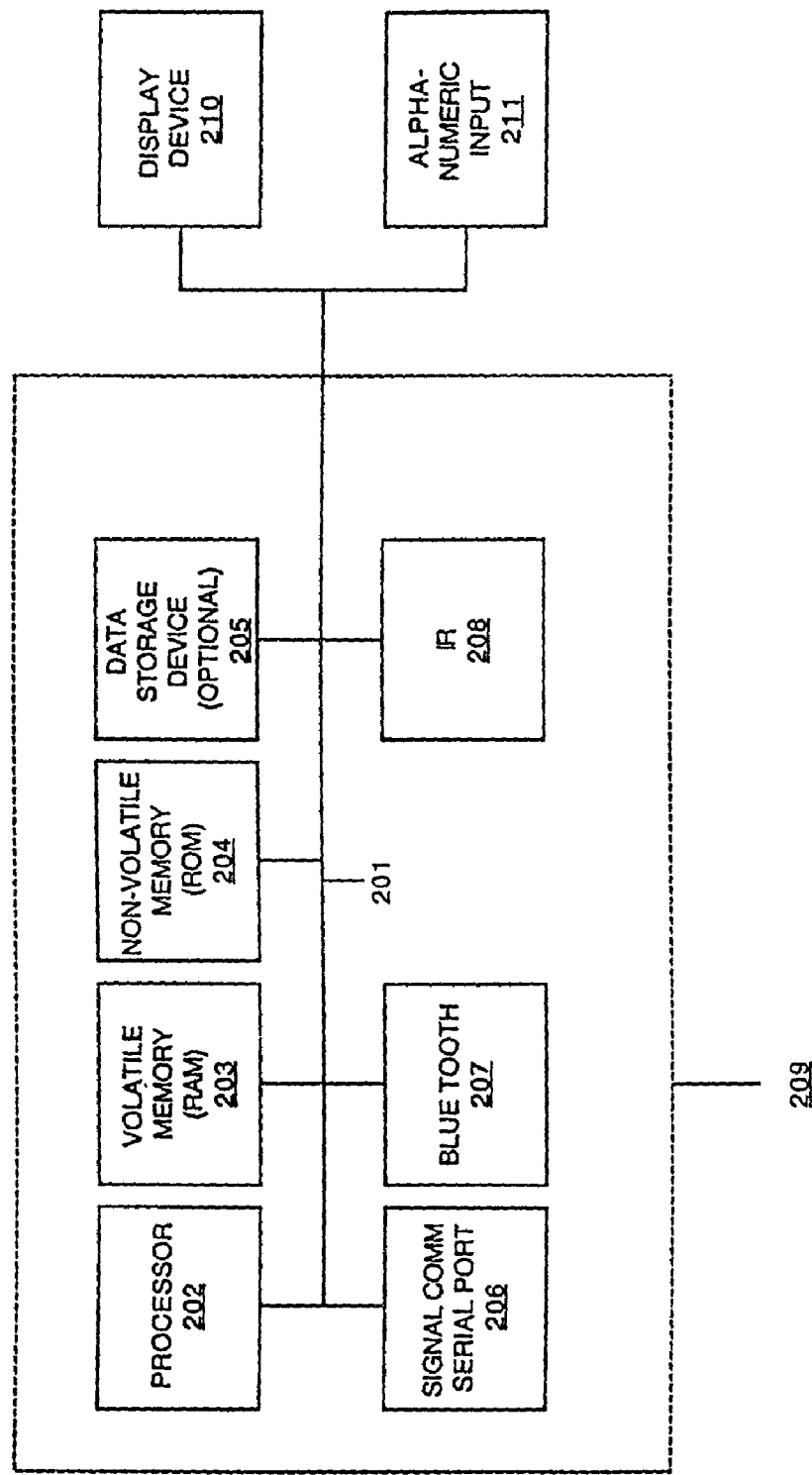

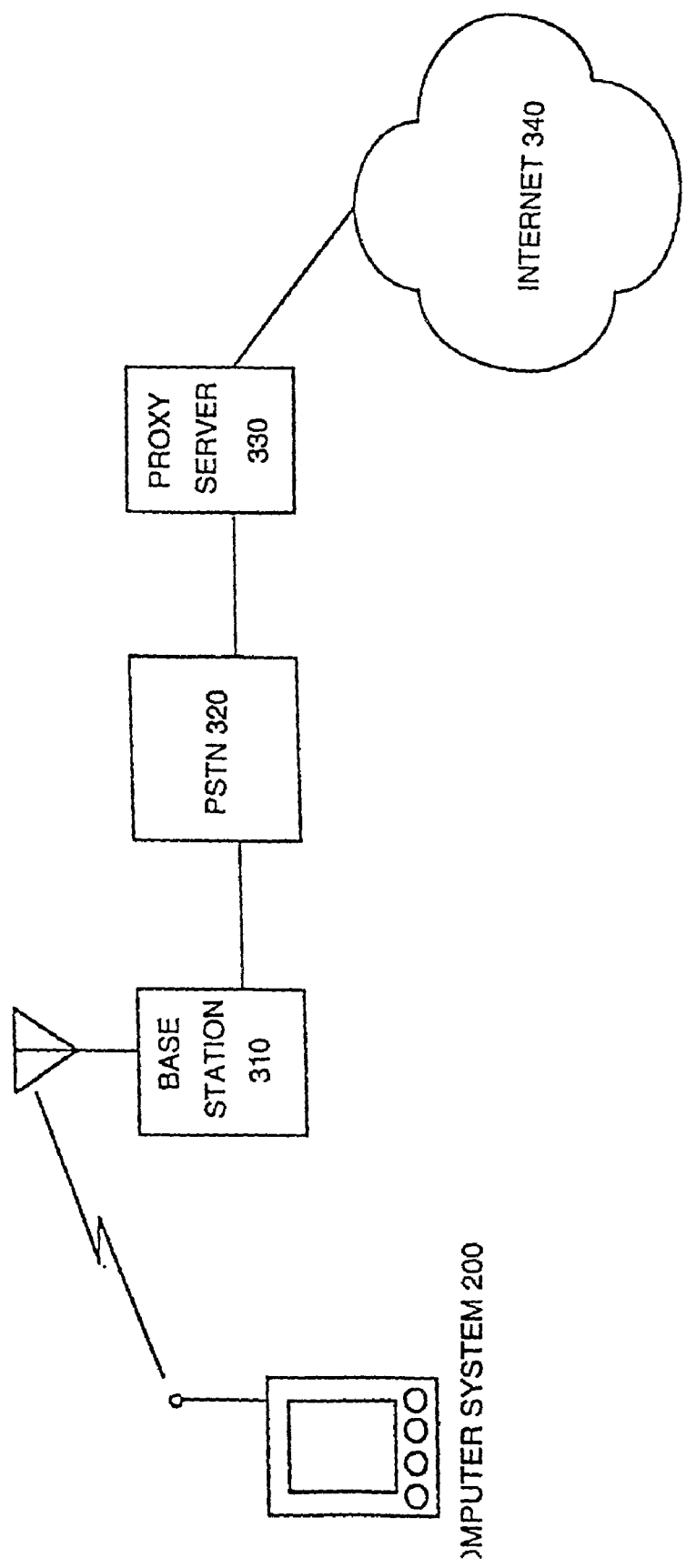

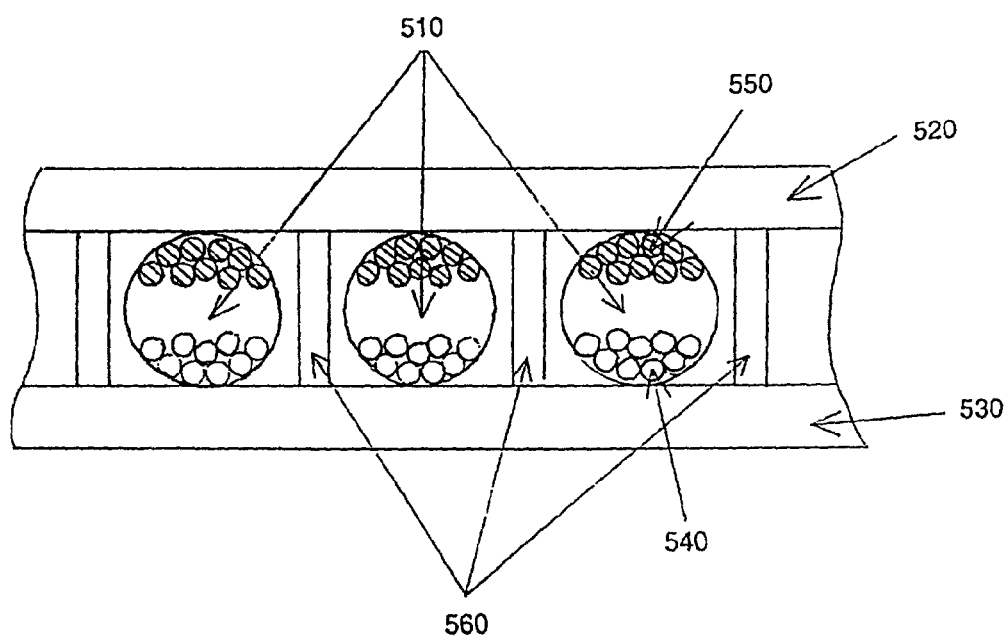

600 FIGURE 6A
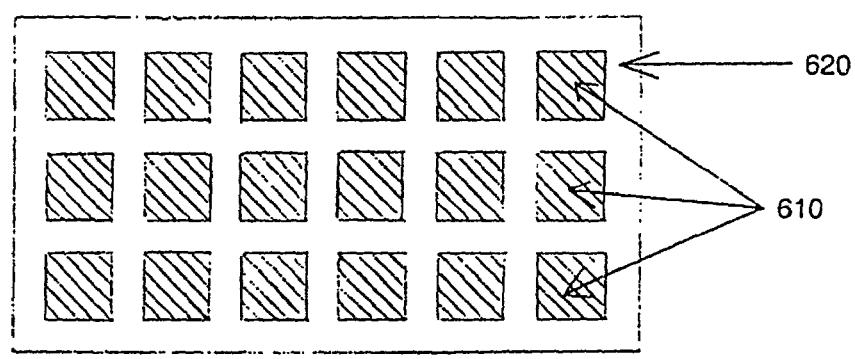
FIGURE 6B
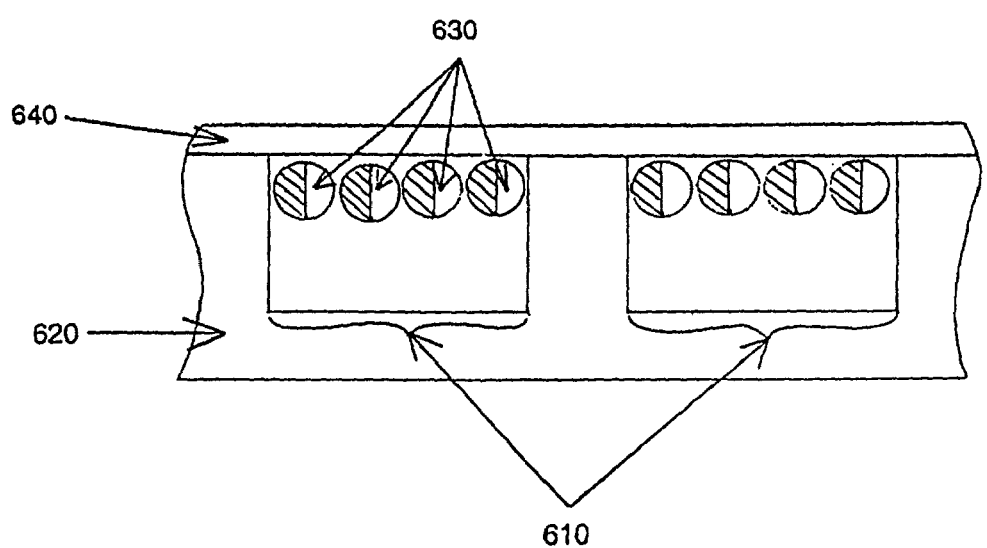

LIGHT GUIDE SPACERS FOR BACKLIGHTING A REFLECTIVE DISPLAY

FIELD OF THE INVENTION

Embodiments of the present invention relate to the field of portable electronic devices that contain display devices. More particularly, embodiments of the present invention relate to reflective displays which use light guides to conduct light through the display from a backlight device.

BACKGROUND OF THE INVENTION

Advances in computer technology have enabled the further miniaturization of the components required to build computer systems. As such, new categories of computer systems have been created. One of the newer categories of computer systems is the portable, hand held, or "palmtop" computer system, also referred to as a personal digital assistant or PDA. Other examples of a portable computer system include electronic address books, electronic day planners, electronic schedulers and the like.

A palmtop computer system is a computer that is small enough to be held in the user's hand and as such is "palm-sized." As a result, palmtops are readily carried about in the user's briefcase, purse, and in some instances, in the user's pocket. By virtue of its size, the palmtop computer, being inherently lightweight, is therefore exceptionally portable and convenient.

Flat panel reflective displays are frequently used in palmtop computer systems due to their light weight, low cost, and simplicity. Reflective displays do not emit light from an internal source but rely upon reflecting light from another source to illuminate the display. However, reflective displays have disadvantages such as being relatively thick and inefficient due to the need for a front light apparatus to illuminate the display. FIG. 1A is a sectional view of an exemplary prior art reflective display assembly in a handheld computer. In FIG. 1A, an input assembly 110 is disposed above a light guide 120 which is disposed above a reflective display 130. Light guide 120 uses microstructures 121 on its top surface to reflect light from light sources 140 down onto reflective display 130 to illuminate the display. Light guide 120 is sufficiently transparent that light reflected from reflective display 130 can pass through to allow a user to view the display.

One disadvantage associated with the reflective display assembly of FIG. 1A is the fact that light guide 120 has to be transparent in order for reflective display 130 to be visible to a user. Because of this requirement, light guide 120 is not optimized to reflect light onto reflective display 130. This leads to higher power usage to provide enough light to illuminate the display sufficiently. This in turn reduces battery life which is a critical resource for handheld computers. Furthermore, light distribution is not uniform in that the portions of the reflective display 130 closest to light sources 140 appear brighter than center portions of the display. Light diffusers, which would normally be used to distribute light more uniformly, are not normally used with reflective displays as they would degrade the display quality by interfering with the light reflected from the display surface.

Another disadvantage of reflective displays is the requirement that the input assembly (e.g., input assembly 110 of FIG. 1A) be rigid. The microstructures on the top surface of light guide 120 are fragile and damaging them could further reduce their ability to reflect light onto reflective display 130. Therefore a space 122 is maintained between the input assembly and the light guide to protect the microstructures from damage. Furthermore, the microstructures have to maintain a precise alignment relative to light sources 140 in order to channel light onto reflective display 130 as evenly as possible. Because of this requirement, input assembly 110 is usually a thick, rigid, glass assembly which prevents manufacturing a thinner, curved, or flexible display assembly.

FIG. 1B is a sectional view of a typical reflective display device such as a liquid crystal display (LCD) utilized in the prior art. A top layer 150 and a bottom layer 160 surround a liquid crystal layer 170 which has seals 180 along the edges to further contain the liquid crystal. Light is reflected from the top surface 161 of bottom layer 160 back to a viewer.

Many display technologies, such as LCDs, which rely upon a fluid layer require some sort of structure to maintain distance between the top layer (e.g., top layer 150) and a bottom layer (e.g., bottom layer 160). In FIG. 1B, glass balls 190 are used for this purpose. Glass balls 190 maintain the distance between top layer 150 and bottom layer 160 yet are small enough to be indiscernible to a user, particularly when they are in a liquid. Other structures used for this purpose include columns or pillars extending from the bottom layer to the top layer which keep the layers separate. These columns are usually glass or some sort of semi-conductor material.

SUMMARY OF THE INVENTION

Accordingly, the need exists for a more efficient reflective display for an electronic device. In particular, a need exists for a reflective display which can uniformly illuminate a reflective display and uses less power, without diminishing the visual quality of the display. While meeting the above stated need, it would be advantageous to provide a reflective display which is thinner, flexible, and permits the use of curved or three dimensional displays for handheld computers.

Embodiments of the present invention are directed to a reflective display assembly for an electronic device which utilizes spacers typically found in some reflective display devices as light guides to conduct light from a backlight through the reflective display itself. The light is then reflected back down onto the top surface of the reflective display by a brightness enhancement film to illuminate the reflective display. Brightness enhancing films disposed above the backlight device can also be utilized to direct more of the available light up through the light guides. The present invention provides efficient, uniform illumination for a reflective display device and embodiments of the present invention facilitate manufacturing thinner, flexible, and curved or three dimensional displays for handheld computers.

Embodiments of the present invention are directed to a reflective display assembly for an electronic device which is disposed above a backlight device. A light guide within the reflective display conducts light from the backlight device, through the reflective display, to the top layer of the reflective display. The light is then reflected down onto the face of the reflective display by a reflecting film above the display. The reflecting film is sufficiently transparent that a viewer can read the illuminated reflective display.

These and other advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

FIG. 2 illustrates an exemplary portable computer system upon which embodiments of the present invention may be utilized.

FIG. 3 is a diagram of an exemplary computer network including a portable computer system utilized in accordance with embodiments of the present invention.

FIG. 5 is a sectional view of a display assembly in accordance with one embodiment of the present invention.

FIGS. 6A and 6B are top and sectional views respectively of an of a reflective display in accordance with one embodiment of the present invention.

DETAILED DESCRIPTION OF THE PREFERRED EMBODIMENT

Figure 1A:
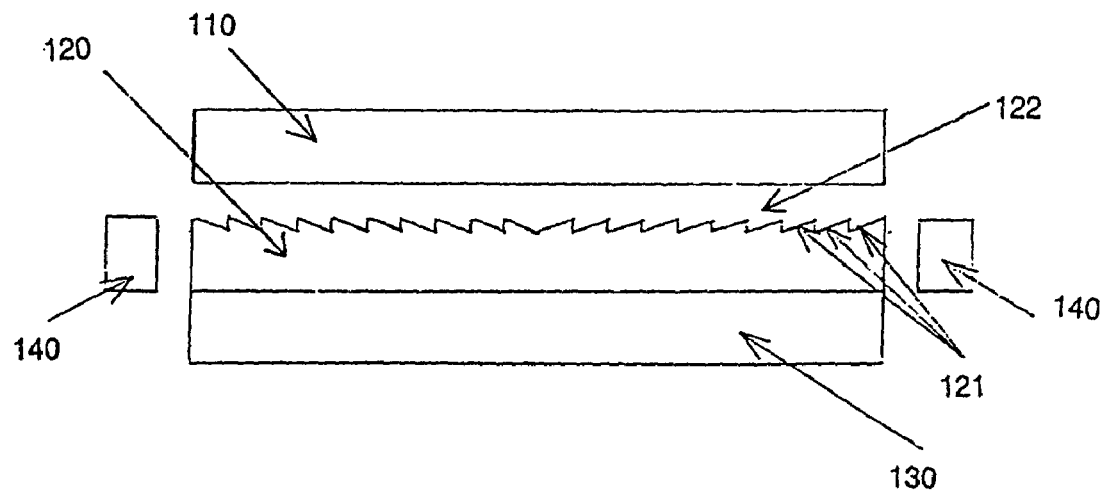
FIGS. 1A-1B are sectional views of prior art display assemblies.
Figure 1B:
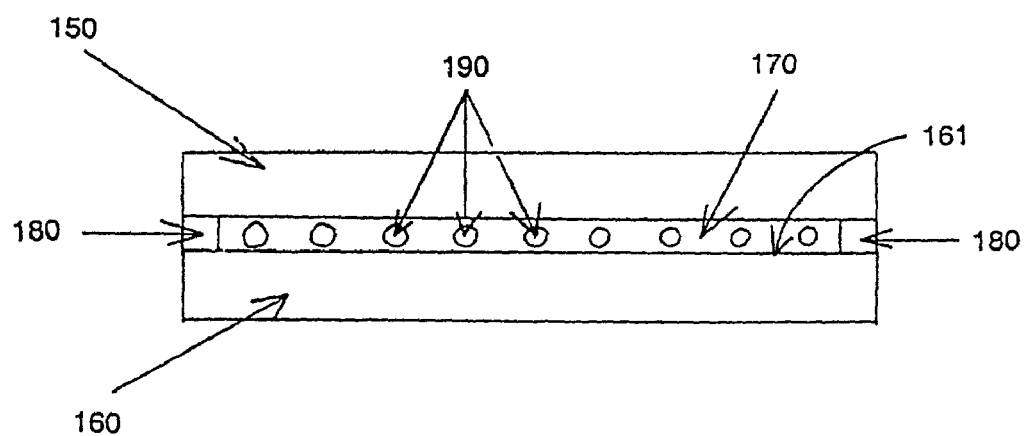

Reference will now be made in detail to the preferred embodiments of the present invention, light guide spacers for backlighting a reflective display, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

FIG. 2 illustrates exemplary circuitry of portable computer system 200. Portable computer system 200 includes an address/data bus 201 for communicating information, a central processor 202 coupled with the bus 201 for processing information and instructions, a volatile memory 203 (e.g., random access memory RAM) coupled with the bus 201 for storing information and instructions for the central processor 202 and a non-volatile memory 204 (e.g., read only memory ROM) coupled with the bus 201 for storing static information and instructions for the processor 202. Portable computer system 200 also includes an optional data storage device 205 (e.g., thin profile removable memory) coupled with the bus 201 for storing information and instructions and which can be removable.

As described above, portable computer system 200 also contains a signal communication device 206, also coupled to bus 201. Signal communication device 206 can be a serial port (or USB port) for communicating with a cradle (not shown). In addition to device 206, wireless communication links can be established between the portable computer system 200 and a host computer system (or another portable computer system) using a Bluetooth wireless device 207 or an infrared device 208. These components are housed on a circuit board 209 which is contained within a cover assembly.

Also included in computer system 200 of FIG. 2 is a display device 210. Display device 210 may be an electronic ink, electronic paper, digital paper or other reflective display devices suitable for creating graphic images and alphanumeric characters recognizable to the user.

Device 200 also includes an alphanumeric input device 211 coupled with bus 201. In the present invention, the input device 211 may include a flat panel resistive touch screen display as described above. Input device 211 can communicate information (spatial data) and command selections to the central processor 202. Input device 211 is capable of registering a position on the display device 210 where contact is made.

FIG. 3 is a block diagram of an exemplary network environment 300 including a portable computer system (e.g., portable computer system 200) upon which embodiments of the present invention may be practiced, in accordance with one embodiment of the present invention. Portable computer system 200 is also known as a palmtop or palm-sized computer system. In one embodiment, portable computer system 200 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices that may have the ability to conduct wireless communications with a network. As such, for purposes of the present application, the terms "portable computer" and "mobile device" will be considered synonymous and will be used interchangeably.

Base station 310 can be both a transmitter and receiver base station, which can be implemented by coupling it into an existing public switched telephone network 320. Implemented in this manner, base station 310 enables portable computer system 200 to communicate with a proxy server computer system 330, which is coupled by wire to the existing public switched telephone network 320. Furthermore, proxy server computer system 330 is coupled to the Internet 340, thereby enabling portable computer system 200 to communicate with the Internet 340. When communicating with a Web site over Internet 340, protocols such as CTP (Compact Transport Protocol) and CML (Compact Markup Language) and WML (Wireless Markup Language) can be used by portable computer system 200 in the present embodiment.

It should be appreciated that one of the functions of proxy server 330 is to perform operations over the Internet 340 on behalf of portable computer system 200. For example, proxy server 330 has a particular Internet address and acts as a proxy device for portable computer system 200 over the Internet 340. It should be further appreciated that other embodiments of a communications network, planned or envisioned, may be utilized in accordance with the present invention. For example, a wireless connection may be made from portable computer system 200 directly to the Internet 340.

The data and information which are communicated between base station 310 and portable computer system 200 are the same type of information and data that can conventionally be transferred and received over a public switched telephone network. Additionally, in FIG. 3, the existing public switched telephone network could also be a packet-based network utilized by some conventional portable computer systems. However, a wireless communication interface is utilized to communicate data and information between portable computer system 200 and base station 310. Furthermore, nearly any wireless network can support the functionality to be disclosed herein.

Figure 4A:
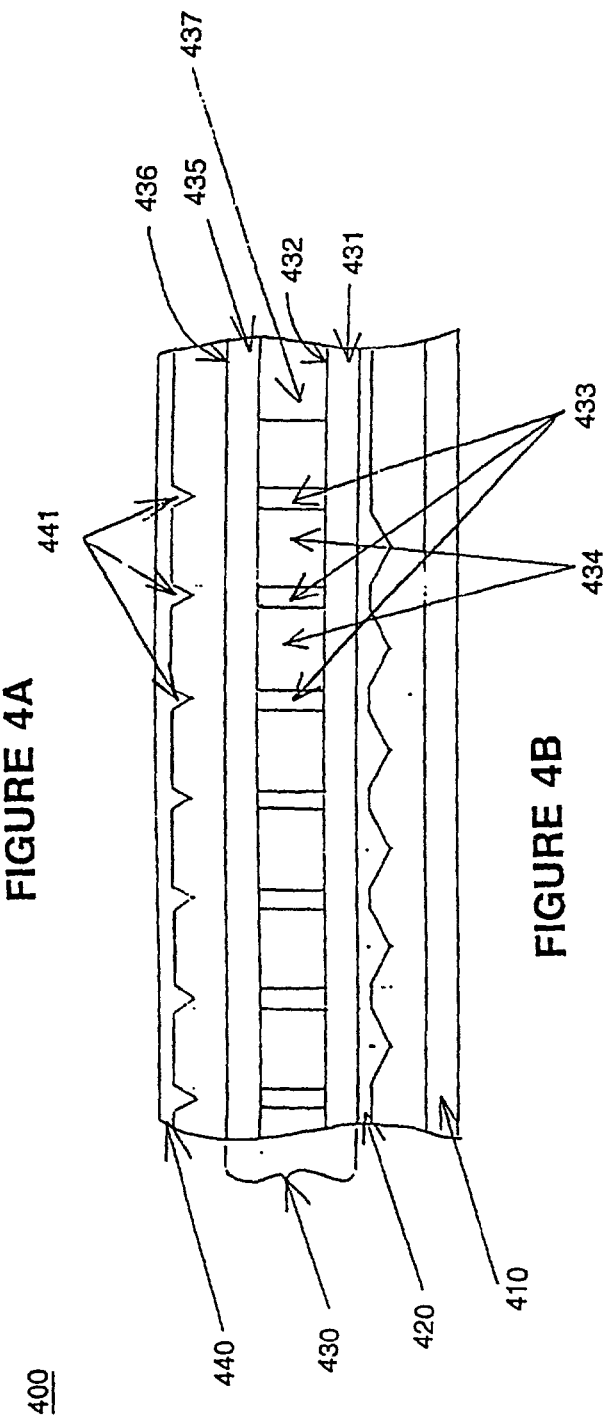
FIGS. 4A and 4B are a sectional view and a top view of a reflective display in accordance with embodiments of the present invention.

FIG. 4A is a sectional view of an exemplary reflective display assembly 400 which has a reflective display that utilizes light guide spacer in accordance with embodiments of the present invention. In assembly 400, a backlight device 410 is disposed below an optional brightness enhancement film (BEF) 420 and a reflective display 430. BEF film 420 is used in embodiments of the present invention to more precisely direct light from backlight device 410 into the light guide spacers of the present invention. Microstructures on the bottom of BEF 420 direct light toward the light guide spacers by reflecting light away from areas of reflective display 430 which do not have light guide spacers. This concentrates the greatest amount of available light toward the light guide spacers and in turn creates a brighter reflective display.

In one embodiment, backlight device 410 is an electro-luminescent device. An electro-luminescent device is a phosphor sheet with attached electrodes. When a sinusoidal signal is applied, the entire face of the sheet lights up. Electro-luminescent backlight devices are very thin and flexible and facilitate, for example, creating a display assembly for an electronic device which has a flexible or curved face. Another advantage to using an electro-luminescent backlight device is that the light is uniformly distributed across the entire surface of the display. In other embodiments of the present invention, backlight device 410 can be, for example, a light emitting diode (LED) device or a cold cathode fluorescent tube (CCFT) backlight device.

Figure 4B:
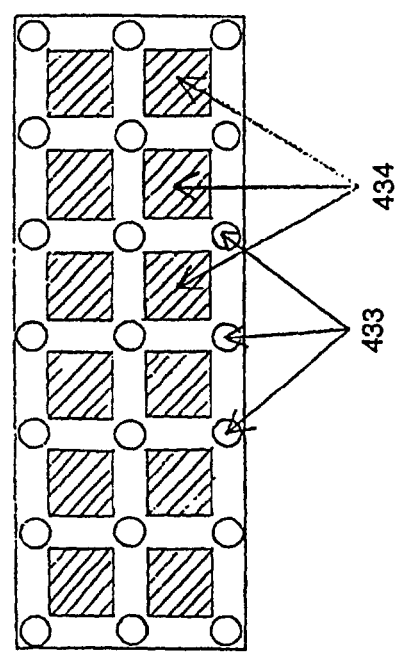

Reflective display 430 is further comprised of bottom sheet 431 having a top surface 432, light guide spacers 433, sub-pixel areas 434, a top sheet 435 having a top surface 436, and seals 437. In one embodiment top surface 432 is a reflective layer which reflects light back through top sheet 435. In one embodiment, bottom sheet 431 and top sheet 435 are a transparent plastic material such as PET plastic which are flexible and allow light to pass through it. When used in conjunction with a flexible electro-luminescent backlight (e.g., backlight device 410) reflective display assembly 400 can be a flexible, backlighted, reflective display. Light guide spacers 433 extend through the reflective material of top surface 432 and conduct light from backlight device 410 which passes through bottom sheet 431 to top sheet 435 which is transparent enough for the light to pass through top surface 436. Light guide spacers 433 are arranged to around an area of reflective display 430 such as a pixel or sub-pixel area by, for example, placing light guide spacers in the corners of areas between sub-pixels as shown in FIG. 4B in which light guide spacers 433 surround sub-pixel areas 434. In one embodiment, seals 437 are able to conduct light as well.

Light which passes through top sheet 435 reflects off of microstructures on the bottom of a front light reflecting film 440 which has the characteristics of a dual brightness enhancement film (DBEF). DBEF layers are used to recycle light in display devices by, for example, reflecting light which does not pass through a polarizing layer. In one embodiment of the present invention, front light reflecting film 440 has reflective pyramid shaped microstructures 441 which reflect light that is conducted by light guide spacers 433 back down onto reflective display 430. However, front light reflecting film 440 is sufficiently transparent to allow a user to view reflective display 430. This facilitates a more uniform distribution of light across reflective display 430. Front light reflecting film 440 has a mesh structure and the pitch of reflective microstructures 441 is aligned with light guide spacers 433 to efficiently reflect light onto reflective display 430 without diminishing the display quality.

FIG. 5 is a sectional view of an exemplary reflective display 500 for an electronic device which uses light guide spacers in accordance with embodiments of the present invention. Reflective display 500 is an electronic ink display which uses charged, colored particles to create images. In FIG. 5, microcapsules 510 are disposed between a top layer 520 and a bottom layer 530.

In one embodiment, microcapsules 510 contain positively charged white particles 540 and negatively charged black particles 550 which are suspended in a clear fluid or, in another embodiment, are suspended in a black ink. In another embodiment, colored particles (e.g., red, green, and blue) or color filers are used so that a color display is possible rather than monochrome. When a negative electric field is applied to top layer 520, positively charged white particles 540 are attracted to top layer 520 and move to the top of microcapsule 510 to become visible to a user, thus making the surface appear white at that portion of display 500. At the same time, an opposite electric field pulls black particles 550 toward bottom layer 530 of display 500 where they are hidden. By reversing this process and applying a positive electric field to top layer 520, as shown in FIG. 5, the black particles now appear at the top of microcapsule 510, which now makes that portion of display 500 appear dark, while the white particles are pulled to the bottom of microcapsule 510.

In one embodiment, top layer 520 and bottom layer 530 are clear electrodes. In another embodiment, electronic ink microcapsules 510 are disposed between two clear, flexible plastic layers (e.g., top layer 520 and bottom layer 530) to create an electronic paper display. Electronic paper has advantages over conventional display devices used in handheld computers because it is thin and flexible. Because it can hold an image when power is no longer supplied, it requires substantially less power than other display technologies. This is a critical issue for handheld electronic devices which have limited battery life.

In the present invention, reflective display 500 is further comprised of a light guide spacer 560 which conducts light from a backlight device (e.g., backlight device 410 of FIG. 4A) which has passed through bottom layer 530 to top layer 520. The light is then reflected back onto reflective display 500 by a front light reflecting film (e.g., front light reflecting film 440 of FIG. 4A) as previously described.

FIGS. 6A and 6B are top and sectional views respectively of an exemplary electronic paper display 600 which uses light guide spacers in accordance with embodiments of the present invention. FIG. 6A shows a top view of electronic paper display 600 showing a plurality of enclosures 610 which, in one embodiment, are embossed into a substrate 620 using micro-embossing techniques. In one embodiment, enclosures 610 are sub-pixel areas of electronic paper display 600. However, enclosures 610 can, in another embodiment, contain multiple sub-pixels to define a pixel of display 600.

Enclosures 610 hold a plurality of particles 630 which, for example are white on one side and black on another side. Particles 630 have a polarity such that, in one embodiment, the black portion of the particle is negatively charged while the white portion of the particle is positively charged. Particles 630 are suspended in a liquid and held in enclosures 610 by a transparent top layer 640. When a negative electric field is applied to top layer 640 the positive portions of are attracted to the electric field. This causes particles 630 to rotate in the liquid such that the white portions of particles 630 are facing top layer 640 and makes reflective display appear to be white at that portion of the display. When a positive electric field is applied to top layer 640, the negatively charged black portion of particle 630 is attracted to top layer 640 and reflective display 600 appears to be black in that area.

In one embodiment of the present invention, substrate 620 is a transparent layer, such as a mylar sheet, which can conduct light from a backlight device (e.g., backlight device 210 of FIG. 2) to top layer 640. In so doing, substrate 620 acts as the light guide spacer for electronic paper display 600. The conducted light is then reflected back onto display 600 by a front light reflecting film (e.g., front light reflecting film 440 of FIG. 4). An advantage of display 600 is that light is conducted uniformly over a greater surface area of the display which results in a brighter, clearer display.

In another embodiment of the present invention, enclosures 610 contain microcapsules (e.g., microcapsules 510 of FIG. 5) containing charged, colored particles (e.g., white particles 540 and black particles 550 of FIG. 5). When a positive electrical current is applied to top layer 640, the negatively charged particles (e.g., black particles 550 of FIG. 5) within the microcapsules are attracted to top sheet 640 and reflective display 600 appears dark in that region.

Figure 7:
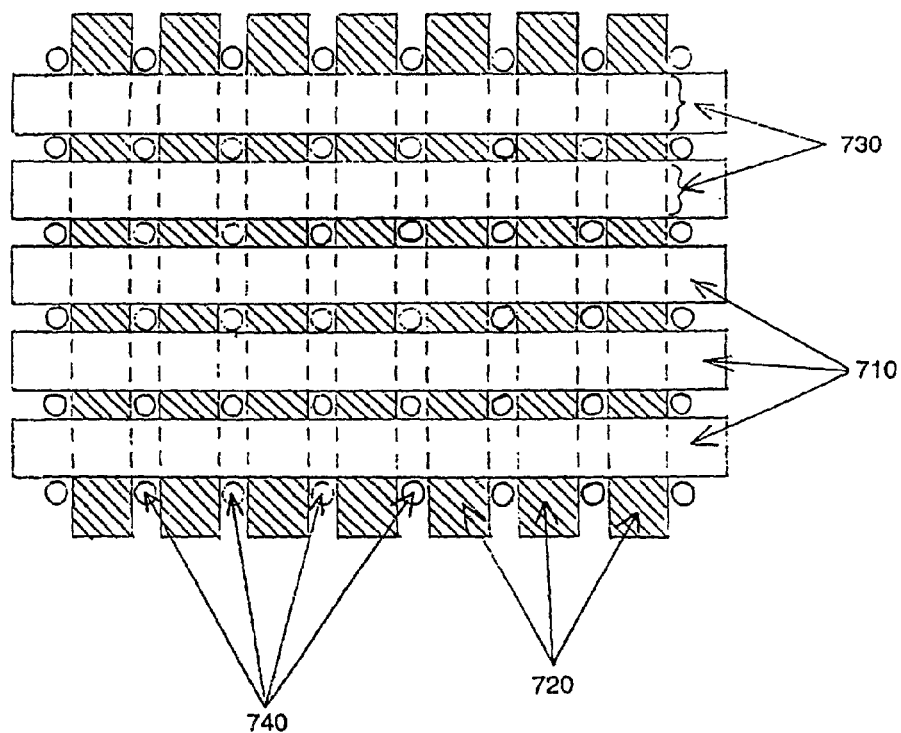
FIG. 7 is a sectional view of a reflective display in accordance with one embodiment of the present invention.

FIG. 7 is a top view of an exemplary digital paper display 700 utilizing micro-machining technology and light guide spacers in accordance with embodiments of the present invention. Digital paper display 700 can be used as a reflective display (e.g., reflective display 430 of FIG. 4A) for an electronic device. In FIG. 7, a plurality of thin, flexible, aluminum strips 710 are disposed across the surface of the display. The ends of aluminum strips 710 are coupled with electrical traces for carrying electrical current away from the aluminum strips to complete an electrical circuit. A plurality of electrodes 720 are disposed beneath aluminum strips 710. In one embodiment, electrodes 720 are Indium Tin Oxide (ITO) electrodes. The intersection where aluminum strips 710 overlie electrodes 720 defines a pixel area 730.

An electrical current is applied to a selected electrode and is conducted away via a selected strip of aluminum through one of the defined pixel areas 730. As current passes through pixel area 730, it causes the aluminum strip in the region of pixel area 730 to deflect. In so doing, the reflective property of the pixel area is changed and light is now reflected back to a viewer at a different wavelength. By altering the current passing through the electrodes, the amount of deflection in the pixel areas can be controlled to create a spectrum of colors.

In the present invention, light guide spacers 740 are inserted into the corner areas between the pixels. This is easily accomplished because small gaps are necessary between the individual aluminum strips 710 and the individual electrodes 720 as shown in FIG. 7. In another embodiment, small portions of the corners of the pixel areas are removed to accommodate larger light guide spacers. When used in conjunction with a backlight device (e.g., backlight device 410 of FIG. 4A), light is conducted by light guide spacers 740 and is reflected onto reflective display 700 by a front light reflecting film (e.g., front light reflecting film 440 of FIG. 4A) as previously described.

Figure 8:
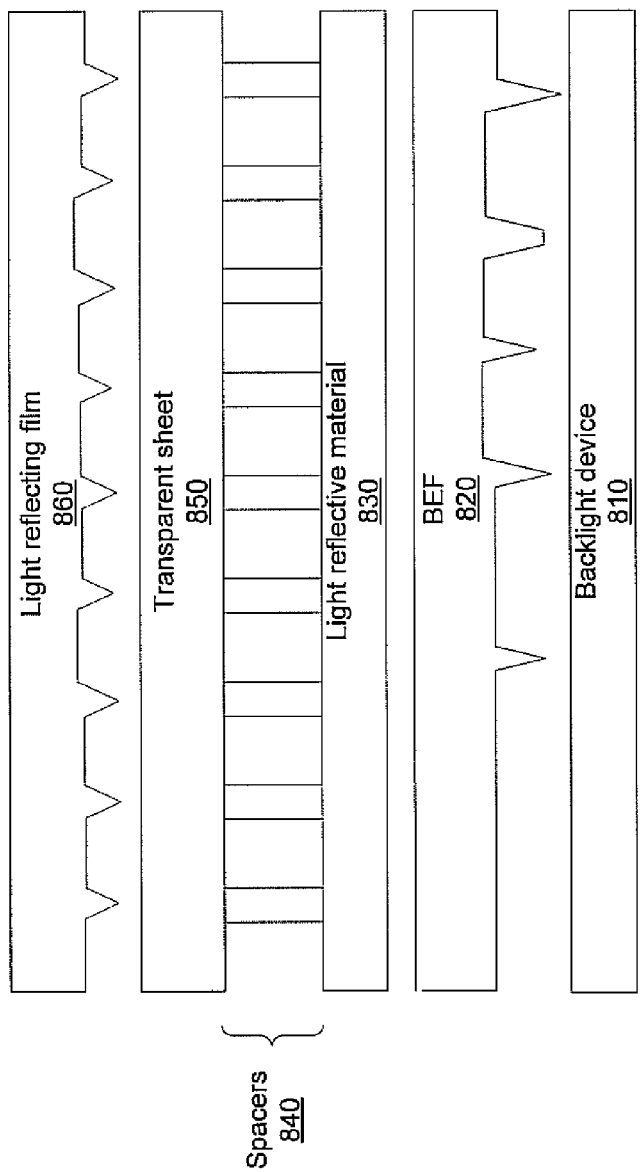

Referring now to FIG. 8, a display assembly according to one embodiment of the present invention is shown. The display assembly comprises a backlight device 810, a BEF 820 structure, a light reflective material 830, a plurality of spacers 840, a transparent sheet 850 and a light reflecting film 860. The backlight device 810 is substantially similar to the backlight device 410 of FIG. 4A. The BEF 820 structure operates substantially similar to the BEF 420 that has been described above. According to one embodiment, the light reflective material 830 is similar to the top surface 432, as described above with respect to FIG. 4A. It is appreciated that the plurality of spacers 840 are substantially similar to the spacers 433 of FIG. 4A. According to one embodiment, the transparent sheet 850 is substantially similar to the top sheet 435, as presented above. In one embodiment, the light reflecting film 860 is substantially similar to that of front light reflecting film 440 of FIG. 4A.

The preferred embodiment of the present invention, light guide spacers for backlighting a reflective display, is thus described. While the present invention has been described in particular embodiments, it should be appreciated that the present invention should not be construed as limited by such embodiments, but rather construed according to the following claims.

What is claimed is:

1. A display assembly for a portable device comprising:
a backlight device;
a low power reflective-type display atop said backlight device;
a transparent sheet atop said low power reflective-type display; and
a light reflecting material disposed between said backlight device and said low power reflective-type display, wherein said light reflecting material reflects said light received from said low power reflective-type display,
wherein said low power reflective-type display comprises a plurality of light conducting spacers that form at least a sub-pixel area, wherein said plurality of light conducting spacers said light reflecting material and said transparent sheet, and wherein said transparent sheet outputs light received from said backlight device via said low power reflective-type display.

2. A display assembly for a portable device comprising:
a backlight device operable to emit light;
a low power reflective-type display atop said backlight device comprising a plurality of light conducting spacers that form at least a subpixel area, wherein said plurality of light conducting spacers transmits said light;
a transparent sheet atop said low power reflective-type display, wherein said transparent sheet outputs light received from said low power reflective-type display via said plurality of light conducting spacers located between said backlight device and said transparent sheet; and
a light reflecting film comprising at least one reflective pyramid shaped microstructure, wherein said light reflecting film is atop said transparent sheet, wherein said light reflecting film passes a first portion of said light received from said low power reflective-type display via said transparent sheet, and wherein said light reflecting film reflects a second portion of said light back to said low power reflective-type display to be recycled for subsequently passing through said light reflecting film.

3. A display assembly for a portable device comprising:
a backlight device;
a low power reflective-type display atop said backlight device comprising a plurality of light conducting spacers that form at least a subpixel area, wherein said plurality of light conducting spacers transmits light from said back light device;
a transparent sheet atop said low power reflective-type display, wherein said transparent sheet outputs light received from said low power reflective-type display via said plurality of light conducting spacers located between said backlight device and said transparent sheet; and a brightness enhancing film (BEF) located between said backlight device and said low power reflective-type display, wherein microstructures at a bottom portion of said BEF concentrates light toward said plurality of light conducting spacers and directs light away from portions of said low power reflective-type display without said plurality of light conducting spacers.

4. The display assembly of claim 1, wherein said backlight device is an electro-luminescent (EL) light device.

5. The display assembly of claim 1, wherein said backlight device comprises at least one light emitting diode (LED).

6. The display assembly of claim 1, wherein said backlight device is a cold cathode fluorescent tube (CCFT) light device.

7. The display assembly of claim 1, further comprising a brightness enhancing film (BEF) located between said backlight device and said low power reflective-type display, wherein a microstructure on a bottom of said BEF directs light toward said plurality of light conducting spacers and reflects light away from at least one portion of said low power reflective-type display without said plurality of spacers.

8. The display assembly of claim 1, wherein said low power reflective-type display is an electronic ink display.

9. The display assembly of claim 1, wherein said low power reflective-type display comprises an electronic paper display.

10. The display assembly of claim 1, wherein said low power reflective-type display is a digital paper display utilizing micro-machining technology.

11. The display assembly of claim 2, wherein said backlight device is an electro-luminescent (EL) light device.

12. The display assembly of claim 2, wherein said backlight device comprises at least one light emitting diode (LED).

13. The display assembly of claim 2, wherein said backlight device is a cold cathode fluorescent tube (CCFT) light device.

14. The display assembly of claim 2, further comprising a brightness enhancing film (BEF) located between said backlight device and said low power reflective-type display, wherein a microstructure on a bottom of said BEF directs light toward said plurality of light conducting spacers and directs light away from at least one portion of said low power reflective-type display without said plurality of light conducting spacers.

15. The display assembly of claim 2, wherein said low power reflective-type display is an electronic ink display.

16. The display assembly of claim 2, wherein said low power reflective-type display comprises an electronic paper display.

17. The display assembly of claim 2, wherein said low power reflective-type display is a digital paper display utilizing micro-machining technology.

18. The display assembly of claim 3, wherein said backlight device is an electro-luminescent (EL) light device.

19. The display assembly of claim 3, wherein said backlight device comprises at least one light emitting diode (LED).

20. The display assembly of claim 3, wherein said backlight device is a cold cathode fluorescent tube (CCFT) light device.

21. The display assembly of claim 3, wherein said low power reflective-type display is an electronic ink display.

22. The display assembly of claim 3, wherein said low power reflective-type display comprises an electronic paper display.

23. The display assembly of claim 3, wherein said low power reflective-type display is a digital paper display utilizing micro-machining technology.

* * * * *

UNITED STATES PATENT AND TRADEMARK OFFICE
CERTIFICATE OF CORRECTION

| | | |
|---|---|---|
| PATENT NO. | : 7,852,430 B1 | Page 1 of 1 |
| APPLICATION NO. | : 09/997532 | |
| DATED | : December 14, 2010 | |
| INVENTOR(S) | : Shawn R. Gettmey | |

It is certified that error appears in the above-identified patent and that said Letters Patent is hereby corrected as shown below:

Column 3, line 21, below "invention." insert -- FIGURE 8 is a diagram of a display assembly in accordance with one embodiment of the present invention. --.

Column 8, line 29, in Claim 1, delete "spacers said" and insert -- spacers is located between said --, therefor.

Signed and Sealed this
Fifth Day of June, 2012

David J. Kappos
*Director of the United States Patent and Trademark Office*